US011636374B2

United States Patent
McMahon et al.

(10) Patent No.: US 11,636,374 B2
(45) Date of Patent: Apr. 25, 2023

(54) EXPONENTIAL SPIN EMBEDDING FOR QUANTUM COMPUTERS

(71) Applicant: QC Ware Corp., Palo Alto, CA (US)

(72) Inventors: Peter L. McMahon, Ithaca, NY (US); Robert Michael Parrish, Woodside, CA (US)

(73) Assignee: QC Ware Corp., Palo Alto, CA (US)

( * ) Notice: Subject to any disclaimer, the term of this patent is extended or adjusted under 35 U.S.C. 154(b) by 0 days.

(21) Appl. No.: 17/538,805

(22) Filed: Nov. 30, 2021

(65) Prior Publication Data

US 2022/0391741 A1     Dec. 8, 2022
US 2022/0391741 A1     Dec. 8, 2022

Related U.S. Application Data

(60) Provisional application No. 63/196,597, filed on Jun. 3, 2021.

(51) Int. Cl.
*G06N 10/20* (2022.01)
*G06N 10/40* (2022.01)

(52) U.S. Cl.
CPC ............ *G06N 10/20* (2022.01); *G06N 10/40* (2022.01)

(58) Field of Classification Search
CPC .............................. G06N 10/20; G06N 10/40
See application file for complete search history.

(56) References Cited

U.S. PATENT DOCUMENTS

| | | | |
|---|---|---|---|
| 2003/0005010 A1* | 1/2003 | Cleve | B82Y 10/00 708/403 |
| 2009/0087084 A1* | 4/2009 | Neigovzen | G06K 9/62 382/159 |
| 2018/0096085 A1 | 4/2018 | Rubin | |
| 2018/0218279 A1 | 8/2018 | Lechner et al. | |
| 2018/0225256 A1 | 8/2018 | Ronnow et al. | |
| 2020/0311590 A1* | 10/2020 | Chen | G06N 10/00 |
| 2020/0327439 A1* | 10/2020 | Greenberg | B82Y 10/00 |
| 2021/0263753 A1* | 8/2021 | Gunlycke | G06F 9/44505 |
| 2021/0279631 A1* | 9/2021 | Pichler | G06N 10/00 |

(Continued)

OTHER PUBLICATIONS

Lin, Exact diagonalization of quantum-spin models, Oct. 1990, 7 pages (Year: 1990).*

(Continued)

*Primary Examiner* — Omar F Fernandez Rivas
*Assistant Examiner* — Tri T Nguyen
(74) *Attorney, Agent, or Firm* — Fenwick & West LLP

(57) ABSTRACT

The disclosure is in the technical field of circuit-model quantum computation. Generally, it concerns methods to use quantum computers to perform computations on classical spin models, where the classical spin models involve a number of spins that is exponential in the number of qubits that comprise the quantum computer. Examples of such computations include optimization and calculation of thermal properties, but extend to a wide variety of calculations that can be performed using the configuration of a spin model with an exponential number of spins. Spin models encompass optimization problems, physics simulations, and neural networks (there is a correspondence between a single spin and a single neuron). This disclosure has applications in these three areas as well as any other area in which a spin model can be used.

20 Claims, 5 Drawing Sheets

(56) References Cited

U.S. PATENT DOCUMENTS

2022/0207402 A1\* 6/2022 Lechner ................ G06F 7/4806
2022/0216982 A1\* 7/2022 McCarty ................ H04L 9/002

OTHER PUBLICATIONS

PCT International Search Report and Written Opinion, PCT Application No. PCT/US21/61249, dated Feb. 15, 2022, 12 pages.

Huang, H-Y. et al., "Predicting Many Properties of a Quantum System from Very Few Measurements," arXiv:2002.08953v2, Apr. 22, 2020, pp. 1-40.

Torlai, G. et al., "Many-body quantum state tomography with neural networks," arXiv:1703.05334v2, Oct. 23, 2017, pp. 1-15.

\* cited by examiner

EXPONENTIAL SPIN EMBEDDING FOR QUANTUM COMPUTERS

CROSS-REFERENCE TO RELATED APPLICATIONS

This application claims priority under 35 U.S.C. § 119(e) to U.S. Provisional Patent Application Ser. No. 63/196,597, 'Exponential Spin Embedding for Quantum Computers,' filed on Jun. 3, 2021, the content of which is incorporated by reference.

BACKGROUND

1. Technical Field

This disclosure relates to the technical field of circuit-model quantum computation, and more particularly, to using quantum computers to perform computations for classical spin models.

2. Description of Related Art

In quantum algorithms for performing quantum computations for classical spin models, a quantum computer with n qubits can be used to store and manipulate a classical spin model with n spins, where each classical spin is mapped to a single qubit. This scheme has the property that the quantum state can represent a superposition of multiple spin configurations simultaneously. However, a notable disadvantage of this scheme is that a quantum computer with n qubits cannot represent a single spin configuration with more than n spins.

SUMMARY

The disclosure is in the technical field of circuit-model quantum computation. Generally, it concerns methods to use quantum computers to perform computations on classical spin models, where the classical spin models involve a number of spins that is exponential in the number of qubits that comprise the quantum computer. (In this disclosure, the terms quantum computer, quantum processor, and quantum processing unit are used interchangeably.) Examples of such computations include optimization and calculation of thermal properties but extend to a wide variety of calculations that can be performed using the configuration of a spin model with an exponential number of spins. Spin models encompass optimization problems, physics simulations, and neural networks (there is a correspondence between a single spin and a single neuron). This disclosure has applications in these three areas as well as any other area in which a spin model can be used.

Some embodiments relate to a method. A classical spin model for I spins defined by a Hamiltonian is received. The Hamiltonian specifies an energy of a configuration of I spins. A quantum circuit is determined. The quantum circuit, when executed by a quantum computer, prepares an n-qubit quantum state $|\psi\rangle$ in the quantum computer, where n<I. The quantum state $|\psi\rangle$ is a superposition representing the configuration of I spins of the classical spin model, $$|\psi\rangle = \sum_{i=0}^{I-1} \alpha_i |i\rangle,$$

where $|i\rangle$ is a spin index of spin i in the spin configuration and $\alpha_i$ is an amplitude that represents the spin value of spin i in the spin configuration.

In some embodiments, the number of spins I is equal to $2^n$.

In some embodiments, $\alpha_i$ may be a real number or a complex number.

In some embodiments, $\text{sign}(\alpha_i)$ represents the spin value of spin i.

In some embodiments, a magnitude of $\alpha_i$ represents the spin value of spin i.

In some embodiments, the spin model is an Ising model, $\alpha_i$ is a real number, and $\text{sign}(\alpha_i)$ represents the spin value of spin i.

In some embodiments, the spin model is an Ising model, $\alpha_i$ is a real number or complex number, and a magnitude of $\alpha_i$ represents the spin value of spin i.

In some embodiments, the spin model is an XY model, $\alpha_i$ is a complex number, and angle $(\alpha_i)$ represents the spin value of spin i.

In some embodiments, the spin model is an XY model, $\alpha_i$ is a real number or complex number, and a magnitude of $\alpha_i$ represents the spin value of spin i.

In some embodiments, the quantum circuit is executed by the quantum computer. A readout quantum circuit is executed by the quantum computer, where execution of the readout quantum circuit modifies the quantum state $|\psi\rangle$ to form an output quantum state. The output quantum state of the quantum computer is measured. A property of the spin configuration (e.g., a macroscopy or microscopic property) is determined based on the measured output state. The property may be a spin value of a spin in the spin configuration, a magnetization of the spin configuration, a spin-spin correlation between two spins in the spin configuration, a sum of spin-spin correlations, an energy of the spin configuration, or a spin structure factor of the spin configuration. In some embodiments, the readout quantum circuit includes quantum gates that perform a Hadamard Test or a Swap Test with the quantum state $|\psi\rangle$. In some embodiments, the readout circuit includes quantum gates that apply a Quantum Fourier Transform to the quantum state $|\psi\rangle$.

In some embodiments, the quantum circuit is repeatedly executed by the quantum computer. For each execution of the quantum circuit: (1) a measurement basis is selected from a set of measurement bases and (2) the quantum state $|\psi\rangle$ of the quantum computer is measured using the selected measurement basis. A neural network model is applied to the measurements, where the neural network model is trained to determine a property of the spin configuration based on the measurements.

In some embodiments, determining the quantum circuit includes the following steps. Quantum gates to be applied to the n qubits of the quantum computer are determined. An arrangement of the quantum gates in the circuit is determined. One or more gate parameters for one or more of the quantum gates are determined. Examples of the quantum gate parameters include at least one of: a single-qubit-rotation-gate angle, a controlled-phase-gate phase, or a generic multi-qubit-gate matrix entry.

In some embodiments, the quantum circuit is executed by the quantum computer. Executing the circuit may include the following steps: (1) initializing each qubit of the n qubits in state 0, (2) applying a Hadamard gate to each qubit of the n qubits, and (3) subsequent to applying the Hadamard gate to each qubit, applying a combination of (e.g., only) Z gates and controlled-Z gates to the n qubits.

In some embodiments, the quantum circuit is executed by the quantum computer. Executing the circuit may include the following steps: (1) initializing each qubit of the n qubits in state 0, (2) applying a Hadamard gate to each qubit of the n qubits, and (3) after applying the Hadamard gate to each qubit, applying a combination of (e.g., only) multi-control-qubit Controlled-U gates to the n qubits. U may be a Z gate or a group of XZX gates.

In some embodiments, the quantum circuit is executed by the quantum computer. A readout quantum circuit is executed by the quantum computer to form an output quantum state. The output quantum state of the quantum computer is measured. A non-quantum computer determines a (e.g., macroscopic or microscopic) property of the spin configuration based on the measured output quantum state. The non-quantum computer determines a second set of quantum circuit parameters based on the determined property. The quantum circuit may be a variational quantum circuit. The second set of quantum circuit parameters may be determined using a Markov Chain Monte Carlo procedure.

Some embodiments relate to a non-transitory computer-readable storage medium comprising stored instructions to determine a quantum circuit. The quantum circuit, when executed by a quantum computer, prepares an n-qubit quantum state $|\psi\rangle$ in the quantum computer. The quantum state $|\psi\rangle$ is a superposition representing a configuration of I spins of a classical spin model, $$|\psi\rangle = \sum_{i=0}^{I-1} \alpha_i |i\rangle,$$

where $|i\rangle$ is a spin index of spin i in the spin configuration and $\alpha_i$ is an amplitude that represents the spin value of spin i in the spin configuration, wherein n<I.

Some embodiments relate to a quantum circuit that, when executed by a quantum computer, prepares an n-qubit quantum state $|\psi\rangle$ in the quantum computer, the quantum state $|\psi\rangle$ being a superposition representing a configuration of I spins of a classical spin model, $$|\psi\rangle = \sum_{i=0}^{I-1} \alpha_i |i\rangle,$$

where $|i\rangle$ is a spin index of spin i in the spin configuration and $\alpha_i$ is an amplitude that represents the spin value of spin i in the spin configuration, wherein n<I.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

In FIGS. 1-3, steps 100, 101, and 102 describe inputs and outputs of the classical processor 200. These inputs/outputs may be transmitted/received by another classical processor. Steps 104 and 105 may be performed on a classical processor, such as classical processor 200 or another classical processor.

DETAILED DESCRIPTION OF CERTAIN EMBODIMENTS

Figure 1:
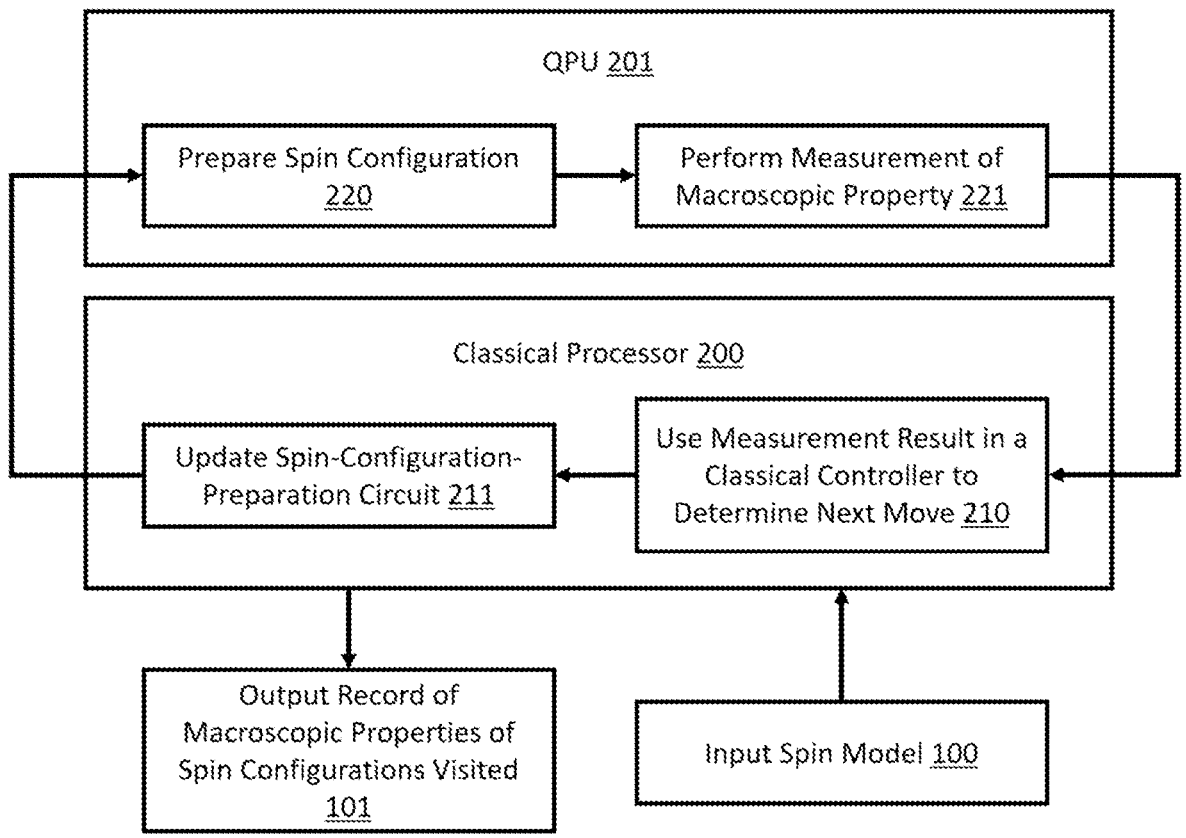
FIG. 1: A flow chart illustrated a method to simulate a classical spin model on a quantum computer using a hybrid method that uses a quantum processor (QPU) 201 and a classical processor 200, according to an embodiment.

The figures and the following description relate to embodiments by way of illustration only. It should be noted that from the following discussion, alternative embodiments of the structures and methods disclosed herein will be readily recognized as viable alternatives that may be employed without departing from the principles of what is disclosed.

Some embodiments relate to a method to embed a classical spin model with exponentially many spins in a quantum computer. Related aspects of the disclosure are methods for initializing and manipulating spin configurations in a quantum computer; hybrid quantum-classical algorithms for evolving the spin configuration in time in a way that mimics the spin system being coupled with a thermal bath at a particular temperature T; methods for reading properties of the spin configuration (such as energy, magnetization, and correlation functions) out from the quantum computer; and methods to use the disclosed quantum embedding of a classical spin model to implement neural networks that have exponentially many neurons as a function of the number of qubits in the quantum computer.

Two examples of classical spin models that we refer to in this disclosure are the Ising model and the XY model. The Ising model is defined by a set of N spins, $\{s_i\}$, and a Hamiltonian (energy function) $H = -\Sigma_{1 \leq i<j \leq N} J_{ij} s_i s_j - \Sigma_{1 \leq i \leq N} h_i s_i$, where $s_i$ represents the value of the ith spin and takes a value of either $-1$ or $+1$, $J_{ij}$ represents the coupling between the ith and jth spins, and $h_i$ represents the external field applied to the ith spin. The XY model is defined by a set of N spins, $\{\vec{s}_i\}$, and a Hamiltonian $H=-\Sigma_{1\leq i<j\leq N}J_{ij}\vec{s}_i \cdot \vec{s}_{ij}-\Sigma_i \vec{h}_i \cdot \vec{s}_i$, where $\vec{s}_i$ represents the value of the ith spin and is a two-dimensional vector with unit length.

In quantum algorithms for performing quantum computations with the classical Ising model, such as the Quantum Approximate Optimization Algorithm (QAOA) and quantum annealing (QA), a quantum computer with n qubits is used to store and manipulate a classical spin model with n spins, where each classical spin is mapped to (or embedded in) a single qubit. The state of the quantum computer in the QAOA represents the spins as follows:

$$|\psi\rangle = \sum_{i=0}^{2^n-1} \alpha_i |i\rangle$$

where n is the number of qubits and $|i\rangle$ represents a particular spin configuration of the Ising model, and $\alpha_i$ represents the weighting of the spin configuration $|i\rangle$. For example, $|i\rangle=|0010\rangle$ represents the 4-spin configuration "spin down" ($s_0=-1$), "spin down" ($s_1=-1$), "spin up" ($s_2=+1$), "spin down" ($s_3=-1$), i.e., ↓↓↑↓. This embedding scheme has the notable property that the quantum state can represent a coherent superposition of multiple physical configurations simultaneously, $$\text{e.g., } |\psi\rangle = \frac{1}{\sqrt{2}}|0010\rangle + \frac{1}{\sqrt{2}}|0001\rangle$$

represents a superposition of $|0010\rangle=$↓↓↑↓ and $|0001\rangle=$↓↓↓↑, both with equal weight and with the same phase. In some cases, there may be advantages to the simultaneous encoding of multiple physical configurations, but one notable disadvantage is this: the encoding of a single physical configuration uses only a tiny fraction of the $\frac{1}{2}^n$ elements of the quantum state.

In this disclosure, we propose a new embedding, which we shall call the exponential embedding because it allows the embedding into a quantum computer of a spin model with an exponential number of spins. The embedding is as follows:

$$|\psi\rangle = \sum_{i=0}^{2^n-1} \alpha_i |i\rangle$$

where n is the number of qubits, $|i\rangle$ represents the index of a single spin in the spin model, and $\alpha_i$ represents the value of the ith spin. In particular, we use a direct mapping between the classical spin values $s_i$ (or $\vec{s}_i$) and the amplitudes $\alpha_i$ in the n-qubit quantum state. Because there are $2^n$ elements in the sum, and hence $2^n$ different $\alpha_i$ values that are stored in the quantum state $|\psi\rangle$, the quantum state, using this embedding, is able to store a classical spin configuration comprising $2^n$ spins. More generally, this embedding is able to store a spin configuration comprising a number of spins that are exponential in the number of qubits n. Note that in contrast to the previous embedding scheme used in QAOA and QA, the exponential embedding uses the quantum state to store a single physical configuration of the system—coherent superpositions over multiple physical configurations are not possible without additional qubits. The gain, however, is that an n qubit quantum system can represent an exponentially large spin system with $2^n$ spins within the exponential embedding. Thus, for example, 10 qubits can be used to embed a spin configuration with 1024 spins, 20 qubits can embed a configuration with over one million spins, and 50 qubits can embed a configuration with $2^{50}$ spins.

There are multiple possible ways to encode a spin value $s_i$ (or $\vec{s}_i$) in an amplitude $\alpha_i$. If the classical spin model is an Ising model, two general strategies are:

1.) a sign encoding, where $\alpha_i$ is set to be a real number and $\text{sign}(\alpha_i)$ determines the spin value: if $\text{sign}(\alpha_i)=-1$ then the ith spin has value $s_i=-1$, and if $\text{sign}(\alpha_i)=+1$ then the ith spin has value $s_i=+1$. An example of the sign encoding is to constrain the system so that $\alpha_i$ is not any real number but a number that takes just one of two values: $\alpha_i=-1/\sqrt{N}$ or $\alpha_i=+1/\sqrt{N}$. This specific variant of the sign encoding has the convenient feature that sums of $\alpha_i$ over i give a quantity that is proportional to a sum over spin values $s_i$, which is not the case if the $\alpha_i$ are arbitrary real numbers. However, by allowing $\alpha_i$ to take arbitrary real values, more complex spin dynamics can be implemented (which in the case of optimization can support a mean-field-annealing implementation).

2.) a magnitude encoding, where $\alpha_i$ can be a real or a complex number, and we use the magnitude of $\alpha_i$ to encode the spin value. For example, a threshold value t can be chosen that is a real number between 0 and 1, and if $|\alpha_i|<t$ then the ith spin has value $s_i=-1$, and if $|\alpha_i|>t$ then the ith spin has value $s_i=+1$.

For Ising spin models, the preferred encoding may be the sign encoding.

If the classical spin model is an XY model, then the classical spin values $\vec{s}_i$ are unit vectors, which can each be equivalently represented by a single real number, (e.g., an angle $\theta_i$). Two strategies for encoding XY spins are then:

1.) a phase encoding, where $\alpha_i$ is set to be a complex number and angle ($\alpha_i$) determines the spin value. For example, we can set $\theta_i=\text{angle}(\alpha_i)$.

2.) a magnitude encoding, where $\alpha_i$ is set to be a real or a complex number, and we use the magnitude of $\alpha_i$ to encode the spin value. For example, we can set $\theta_i=2\pi|\alpha_i|/|\alpha_{max}|$, where $|\alpha_{max}|$ is the maximum value that $|\alpha_i|$ can take.

For XY spin models, the preferred encoding may be the phase encoding.

The spins in the Potts model (the generalization of the Ising model in which the spins can take on one of q possible discrete values, where for q=2 the Potts model reduces to the Ising model) can be encoded in the same way as XY spins, but where the coefficient $\alpha_i$ takes on discrete values instead of continuous values.

For spin models whose spins each use (e.g., require) two real numbers to describe, such as the classical Heisenberg model (whose spins are unit vectors in 3-space), a single spin in a single complex amplitude $\alpha_i$ can be encoded by taking advantage of the fact that the complex amplitude has real and imaginary parts, or equivalently magnitude and phase. For example, a single spin in the classical Heisenberg model can be described by two angles, and these two angles can be encoded in the complex number $\alpha_i$.

For spin models whose spins each use (e.g., require) more than two real numbers to describe, such as an extension of the classical Heisenberg model to spins as unit vectors in 4 dimensions, the spin may be encoded in more than one complex amplitude $\alpha_i$, since each amplitude $\alpha_i$ can encode at most two real numbers.

It is also possible to encode spin models that contain multiple types of spin, e.g., a spin model that comprises a set of Ising spins (which take on binary values from $\{-1,+1\}$) and a set of XY spins (which take on real values). This can be done by choosing the encoding for the Ising spins using an encoding for $\alpha_i$ described above (where the index i covers the indices of the Ising spins in the model) and choosing the encoding for the XY spins using an encoding for $\alpha_i$ described above (where the index i covers the indices of the XY spins in the model).

The choice of encoding has implications for how the state is initialized, manipulated, and read out, with different encodings being more or less effective and/or convenient for different purposes.

Given a choice of spin model (Ising, XY, or another classical spin model type, including hybrid models) and an encoding of spins for that model in the quantum-state amplitudes $\alpha_i$, it's desirable to devise a quantum circuit that can efficiently create quantum states representing spin configurations of interest.

One approach to devising such a circuit is to create a circuit with variational parameters that allow it to create states in many different regions of Hilbert space (e.g., as performed in the development of variational quantum algorithms for quantum chemistry (and quantum simulation of quantum systems more broadly)). This same approach is possible for the method presented in this patent, and in some circumstances it may be desirable. However, in general an arbitrary variational circuit causes a quantum state to be prepared that does abide by the encoding rules. For example, suppose one is working with an Ising model and has chosen the sign encoding where $\alpha_i=-1/\sqrt{N}$ or $\alpha_i=+1/\sqrt{N}$. An arbitrary variational quantum circuit will prepare a state where the amplitudes $\alpha_i$ take on values other than $\pm 1/\sqrt{N}$.

Figure 4:
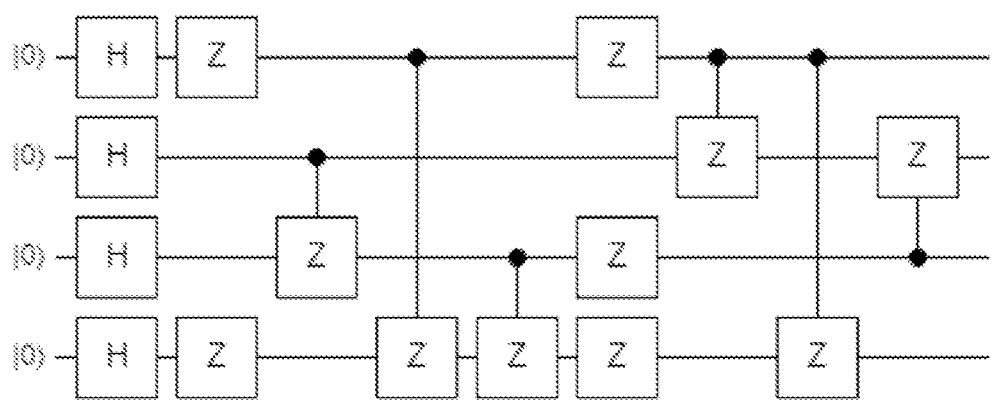
FIG. 4 is an example spin-configuration-preparation circuit that prepares an Ising-model spin configuration using the sign encoding for spins.

For the Ising model with a sign encoding $\alpha_i=\pm 1/\sqrt{N}$, a family of circuits that keeps the quantum state in a subspace that doesn't violate the encoding rules is the following: start with all qubits in the state 0 in the computational basis, apply the Hadamard gate to each qubit, and then apply only Z (single-qubit) gates and, Controlled-Z (two-qubit) gates (e.g., see FIG. 4). A similar but larger family of circuits is one that also begins with every qubit being initialized to state 0 and the Hadamard gate being applied to it. After that, the circuit can apply multi-control-qubit Controlled-U gates with up to n−1 control qubits (e.g., Controlled-U gates; Controlled-Controlled-U gates; Controlled-Controlled-Controlled-U gates, . . . , all the way through Controlled$^{(n-1)}$-U gates), where the target operation unitary U is either U=Z or U=XZX, and the controls of the control qubits can be both standard controls (control is active if control qubit has state 1) or inverse controls (control is active if control qubit has state 0) (e.g., see FIG. 5). Each Controlled$^{(n-1)}$-U gate can cause a single spin in the encoded spin configuration to flip, depending on the choice of controls (which qubits are controlling the gate, and are the controls standard or inverse), the choice of U, and the current spin configuration that is encoded. If a circuit from this family has O(N) multi-qubit Controlled-U gates, it can create a quantum state that represents any possible configuration of N classical Ising spins. It may not be desirable for the circuits used in Exponential-Spin-Embedding algorithms to have O(N) gates, since this corresponds to exponential circuit depth in the number of qubits n, and hence may require an exponential amount of time to execute each circuit. (Depth here refers to the standard definition in quantum computing of the depth of the circuit when compiled to use only one- and two-qubit primitive gates.) A circuit that has depth linear or polynomial in the number of qubits n may not be able to create all possible spin configurations, but may be able to create the subset that are of interest for solving the given problem.

If a given spin model has constraints on the values that the spins can take (e.g., as may arise when considering a binary-variable optimization problem that has constraints on the binary variables, and where the objective function of the optimization problem is given as an Ising Hamiltonian), it is possible to design the quantum circuit that creates the quantum state representing a spin configuration in such a way that any created spin configuration is guaranteed to satisfy the constraints associated with the Hamiltonian. In the language of the optimization community, the circuit can be designed to keep the spin configuration in the "feasible subspace."

After a family of circuits for creating spin-configuration quantum states has been decided, there are many different possible choices for how to initialize the spin-configuration quantum state as well as how to manipulate the spin-configuration quantum state. For initialization, an example choice is to create the state where all the spins take the same value (e.g., spin-up). With an Ising model and sign encoding, starting with all the qubits in the state 0 and applying the Hadamard gate to each qubit creates the all-spins-up configuration.

With the spin-configuration initialized, it can be manipulated by applying different circuits from the family of circuits that preserve the encoding rules. The choice of the circuits to manipulate the state is determined by what the ultimate goal of the computation is. Two goals that this disclosure considers are the sampling of thermal states of a spin model, and the heuristic optimization of a spin model (attempting to find a spin configuration that has a low (e.g., the lowest) energy). Possible updates to the circuit for preparing the spin configuration that the classical processor (e.g., Classical Processor 200) may propose include both changes to the structure of the circuit itself (such as inserting or deleting gates) as well as to modifying the parameters of one or more of the gates (such as changing the rotation angle of a single-qubit rotation gate). In general for spin models in which the spins take on discrete values (such as the Ising model or the Potts model), the circuit updates will involve changes to the circuit that are also discrete (such as adding or removing gates from a discrete set of possible gates), whereas for spin models in which the spins take on continuous values (such as the XY model), the circuit updates will involve changes to the circuit that are continuous (such as modifying the continuous parameter of a rotation gate) and also discrete changes (such as adding or removing gates, where the gates may come from a continuous set).

Once a circuit has been used to create a quantum state representing a particular classical-spin configuration (in a particular choice of encoding), it's desirable to be able to read out properties of the spin configuration. The readout circuits are, in general, specific to the spin model, encoding, and property to read out.

An example readout to perform is to read out the value of one particular spin, the ith spin. This particular readout operation is generic across spin models and encoding. To read out the value of the ith spin, it is sufficient to read out the quantity $\langle i|\psi\rangle$, which is equal to $\alpha_i$. An example circuit to perform this readout is to use either the Hadamard Test or the Swap Test to compute the inner product between $|\psi\rangle$ and $|i\rangle$.

In spin models, a property that is often of interest is the magnetization of the spin configuration. For an Ising model with sign encoding $\alpha_i \pm 1/\sqrt{N}$, the magnetization is defined as $$M = \sum_{i=0}^{N-1} \alpha_i.$$

This can be read out by reading out the quantity $\langle 0|H^{\otimes n}|\psi\rangle$. By applying Hadamard gates to every qubit of the state $|\psi\rangle$, a state whose all-0's amplitude is equal to $$\sum_{i=0}^{N-1} \alpha_i$$

is created. This can be read out by, for example, using a Hadamard Test or a Swap Test between $H^{\otimes n}|\omega\rangle$ and $|0\rangle$, where $H^{\otimes n}$ represents applying a Hadamard gate to each of the n qubits and $|0\rangle$ represents all the qubits in the 0 state.

A property of a spin configuration that is typically of great interest is energy of a spin configuration. The energy depends on the Hamiltonian H of the spin model, so an energy-readout circuit may require knowledge of the Hamiltonian. In some embodiments, the general strategy to perform readout is to use a Hadamard Test or Swap Test where one of the states in the test is the spin-configuration state $|\psi\rangle$, and the other is a carefully constructed state $|\phi\rangle$ that depends on the Hamiltonian.

If the Hamiltonian is that of a 1D Ising model with nearest-neighbor interactions, $H = -\Sigma_{1 \leq i \leq N} J_i s_i s_{i+1}$, then the choice for $$|\phi\rangle \text{ of } |\phi\rangle = C \sum_{i=0}^{N-1} J_i \alpha_{i+1} |i\rangle$$

results in the Hadamard or Swap Test allowing the calculation of $$\langle \phi|\psi\rangle = C \sum_{i=0}^{N-1} J_i \alpha_{i+1} \alpha_i.$$

This is precisely the Ising energy, up to the known normalization constant C. The normalization constant C may be determined entirely by what the values $J_i$ in the Hamiltonian are, chosen such that $|\phi\rangle$ is a normalized state.

If there are poly(n) distinct values of $J_i$, then the circuit to create $|\phi\rangle$ can be polynomial in the number of qubits n, making the circuit efficient to perform. As an example, consider the case where the Hamiltonian is $H = -\Sigma_{1 \leq i \leq N} J s_i s_{i+1}$, (there is only one distinct value of $J_i$ that is the same for all neighboring spins in the 1D chain). The circuit to create $|\phi\rangle$ in this case is to do the following: first, use the spin-configuration-preparation circuit to create the spin-configuration state $|\psi\rangle$; second, apply an adder circuit that performs the map $|i\rangle \to |i+1\rangle$. This creates the desired state. A modification of this allows the read out of the energy of Hamiltonian terms that correspond to next-near-neighbor interactions $H = -\Sigma_{1 \leq i \leq N} J s_i s_{i+2}$: when creating $|\phi\rangle$, use an adder that adds 2 instead of 1, (said differently it performs the map $|i\rangle \to |i+2\rangle$).

If the Hamiltonian is that of a 2D Ising model with nearest-neighbor interactions, the test state $|\phi\rangle$ can be created using a slight modification of the circuit for the 1D Ising model. For a square lattice, each spin has four neighbors, and an example representation of the Hamiltonian is $H = -\Sigma_{1 \leq i \leq N} J s_i s_{i+1} - \Sigma_{1 \leq i \leq N} J s_i s_{i+\sqrt{N}}$. If the state $|\phi\rangle$ is prepared using an adder that adds $\sqrt{N}$, i.e., $|i\rangle |i+\sqrt{N}\rangle$, then the Hadamard or Swap Test between $|\phi\rangle$ and $|\psi\rangle$ gives the contribution to the Ising energy from the interactions between spins that are one row apart. But doing two Hadamard or Swap Tests, one corresponding to $\Sigma_{1 \leq i \leq N} J s_i s_{i+1}$ and another corresponding to $\Sigma_{1 \leq i \leq N} J s_i s_{i+\sqrt{N}}$, the Ising energy of this 2D Ising model can be read out. The given approach to reading out energies from square lattices can be readily extended, by a person familiar with the art, to 2D triangular, Kagome, or other lattices, as well as to 3D or even higher-dimensional lattices. Similarly, the approach to performing energy readout can be readily extended to the case of XY or other spin models.

In even more generality, this method of performing readout of energy of the spin configuration can be used for arbitrary Ising or XY-model Hamiltonians. For both the Ising and the XY models, there is a matrix J that defines the energies due to spin-spin interactions. Since both the spin state $|\psi\rangle$ and the state $|\phi\rangle$ that the Hadamard or Swap Test are used to compute the dot product between have dimension N, the test can compute an energy for at most N spin-spin-interaction terms. However, the J matrix in general encodes $N^2$ spin-spin interactions, so to perform energy readout for a general J matrix may require the execution of N different Hadamard or Swap Tests, using N different states $|\phi\rangle$.

For a J matrix that has some elements equal to zero (some spin-spin interactions that may in principle exist have strength zero), the number of Hadamard or Swap Tests to read out the energy is nnz(J)/N, where "nnz(J)" represents the number of elements of J whose values are not zero.

From this we can see that the energy-readout procedure is remarkably efficient, in terms of the number of Hadamard or Swap Tests to be performed. For a 1D Ising model with nearest-neighbor interactions, nnz(J)≈N, so the number of tests used is N/N=1. For a 2D Ising model on a square lattice, nnz(J)≈2N, so the number of tests used is 2N/N=2. For an Ising model whose spin-spin interactions are on a graph with maximum degree d, then nnz(J)≈d N (at most), so the number of tests used is d. So for any spin model with sparse connectivity, energy readout will be efficient in the number of tests used.

As a concrete example of energy readout for an XY model, if the phase encoding is used, then the dot product $\langle \phi|\psi\rangle$ between $$|\psi\rangle \text{ and } |\phi\rangle = C \sum_{i=0}^{N-1} J_i \alpha_{i+1} |i\rangle$$

is a complex number whose real part is $$\text{Re}[\langle \phi | \psi \rangle] \propto \sum_{i=0}^{N-1} J_i \cos(\theta_{i+1} - \theta_i).$$

This quantity, Re[⟨φ|ψ⟩], can be read out using a Hadamard Test. This is precisely the energy of the nearest-neighbor interactions in the XY model. As has been explained for the Ising model, by appropriate choice and construction of |φ⟩, different sums of energy terms from the XY model can be read out.

The readout of energy from an Ising or XY model is very related to the problem of reading out correlation functions. The methods described above for reading out energies can be readily adapted to read out either individual spin-spin correlations (such as $s_{i=1}s_j$ for any choice of spin index j) or sums of spin-spin correlations (such as $\Sigma_{1 \le j \le N} s_{i=1} s_j$, or even sums over all two-point correlations with all choices of "starting spin", $\Sigma_{1 \le i < j \le N} s_i s_j$). The method to read out individual correlations or sums of correlations is to perform one or more Hadamard or Swap Tests using a state |φ⟩ that has been prepared as a superposition of one or more basis states with amplitudes corresponding to the spins one wants to compute correlations with, e.g., prepare $$|\phi\rangle = C \sum_{i=0}^{N-1} \alpha_{i+1} |i\rangle$$

(where C is a normalization constant) to compute the sum of correlations of nearest-neighbor spins in a 1D chain.

The ability to read out sums of spin-spin correlations enables thermodynamic properties of spin models to be read out. For example, the suspectibility χ of a 2D Ising model is given by a sum of spin-spin correlation functions:

$$\chi = \frac{1}{kT} \sum_m \sum_n (C(m,n) - M^2),$$

where M is the magnetization and C(m, n) is the spin-spin correlation function C(m, n):=⟨$s_{0,0} s_{m,n}$⟩.

Another readout mechanism that can give insight into the correlations between spins is to use the Quantum Fourier Transform and then either directly measure the output state in the computational basis or perform a Hadamard or Swap Test to extract a particular piece of spectral information. As an example, if the state encoding the spin configuration, |ψ⟩, uses the sign encoding $\alpha_i = \pm 1/\sqrt{N}$, it is transformed by the application of the Quantum Fourier Transform to:

$$U_{QFT}|\psi\rangle = \frac{1}{\sqrt{N}} \begin{bmatrix} \alpha_0 + \alpha_1 + \ldots + \alpha_{N-1} \\ \alpha_0 + \omega\alpha_1 + \ldots + \omega^{N-1}\alpha_{N-1} \\ \alpha_0 + \omega^2\alpha_1 + \ldots + \omega^{2(N-1)}\alpha_{N-1} \\ \vdots \\ \alpha_0 + \omega^{N-1}\alpha_1 + \ldots + \omega^{(N-1)(N-1)}\alpha_{N-1} \end{bmatrix}$$

This state encodes information about the periodicity in the spin configuration in |ψ⟩.

If we set $\omega = e^{-i}$, then $U_{QFT}|\psi\rangle$ can be written as:

$$U_{QFT}|\psi\rangle = \begin{bmatrix} S(q=0) \\ S(q=1) \\ S(q=2) \\ \vdots \\ S(q=N-1) \end{bmatrix}$$

where $$S(q) := \frac{1}{\sqrt{N}} \sum_j s_j e^{-i(qj)}.$$

S(q) here is the Spin Structure Factor for a 1D spin model. By measuring the $U_{QFT}|\psi\rangle$ state in the computational basis, the distribution of the Spin Structure Factor for different q values is determined, and in a few repeated measurements the values of q that give the largest S(q) can be determined with high probability (e.g., probability >90% (the exact number may depend on what is meant by "few" and what the distribution S(q) looks like, which is problem-dependent)), if the distribution of S(q) has prominent peaks. The Spin Structure Factor is a relevant quantity to extract when modeling neutron-scattering experiments. Beyond the 1D case, there is a natural extension to computing the more general Spin Structure Factor for higher-dimensional lattices:

$$S(\vec{q}) := \frac{1}{\sqrt{N}} \sum_i s_i e^{-i(\vec{q} \cdot \vec{r}_i)}.$$

Beyond the two general types of readout we have proposed (Hadamard or Swap Tests to extract information with carefully designed states |φ⟩, and periodicity/spectral information from the Quantum Fourier Transform), there is another general type of readout method that may be productively used to efficiently extract useful information from the configuration state |ψ⟩ : methods where measurements of |ψ⟩ are performed whose outcomes are then postprocessed classically to extract relevant quantities.

Two examples of readout methods that fall into this general type are shadow tomography (as described in arXiv: 2002.08953) and neural-network quantum state tomography (as described in arXiv:1703.05334). Both of these readout methods enable the readout of quantities of interest that may be difficult to access via either Hadamard/Swap Tests or Quantum Fourier Transforms without classical postprocessing. The network-network methods are particularly flexible: classical neural networks can be used to extract properties of the spin configuration stored in |ψ⟩ that we do not have explicit constructions to extract, where a classical neural network is trained to be able to output the quantity of interest given an input of results of measurements of the state performed in (e.g., random) bases. Here "bases" typically refers to Pauli-X, Y, or Z bases for individual qubit measurements.

By being able to prepare spin configurations efficiently using variational ansaetze with moderate numbers of parameters, and by being able to read out the energy of a prepared spin configuration, one has the ingredients to perform a hybrid algorithm that operates partially on a quantum computer and partially on a classical computer (also referred to as a non-quantum computer or a classical processor) to either optimize (e.g., minimize) the energy of a given spin Hamiltonian, or to compute thermal properties of the Hamiltonian at a particular temperature T. For the optimization use case, updates to the spin configuration can be chosen in a multitude of ways, including using black-box classical optimizers. For the thermal-property-calculation use case, a Markov-Chain-Monte-Carlo-style algorithm (such as Simulated Annealing) may be applied in which an artificial temperature T is introduced and is used to control the probability of accepting a change to the variational ansatz's parameters, which in turn change the spin configuration (e.g., see FIG. 2).

Besides the Markov-Chain-Monte-Carlo approaches, thermal properties can be extracted using a Thermofield-Double approach. The Thermofield Double is a pure state that comprises two copies of a system, and when one copy is traced out, results in the other copy being a thermal state at a chosen inverse temperature β. The Thermofield Double can be written as the quantum state $$|TFD(\beta)\rangle := \frac{1}{\sqrt{Z}} \sum_n e^{-\beta E_n/2} |n\rangle |n\rangle.$$

When implementing this disclosure's exponential spin embedding, the state $|n\rangle$ is a state representing a classical spin configuration that has energy $E_n$. By making two copies of the qubits and following the established procedure for variationally preparing the Thermofield Double state $|TFD(\beta)\rangle$, a thermal mixture of classical spin configurations can be obtained and thermal properties directly read out, without needing to run Markov-Chain-Monte-Carlo iterations. The tradeoff is that the variational optimization may instead be performed to obtain $|TFD(\beta)\rangle$, but this can be beneficial since once the parameters to create $|TFD(\beta)\rangle$ are known, $|TFD(\beta)\rangle$ can be created repeatedly, whereas Markov-Chain-based methods suffer from correlations between samples and long burn-in times.

For the use case where the methods in this disclosure are used to find the optimal spin configuration for a particular Hamiltonian or other objective function, we note that the methods apply to a wide variety of optimization problems, including binary optimization problems (where the optimization variables are binary, e.g., Ising spins); real-valued optimization problems (where the optimization variables are continuous, e.g., as in with XY spins); discrete-valued optimization problems (where the optimization variables are discrete and can take on more than just two values, e.g., spins in the Potts model). For any optimization problem where one wants to know the optimal objective-function value (e.g., the minimum spin-configuration energy), the methods presented in this disclosure give an efficient procedure for reading out the desired answer (e.g., the energy), provided that the optimization procedure converged to the correct variational parameters. Furthermore, if it's desirable to read out the values of just a subset of the total set of spins in a given problem, if one uses a procedure to read out the value of an individual spin that is efficient, then it will be efficient to read out the values of the subset of spins. An example of a particular use case where it is desirable to read out only a subset of spins is in constrained optimization problems (e.g., see FIG. 3). A constrained binary optimization problem can be converted to an unconstrained binary optimization problem that is realized as an Ising Hamiltonian. The Ising Hamiltonian may have many more spins than the original constrained problem had variables (e.g., the Ising Hamiltonian may have 1,000,000 spins whereas the original problem only has 1,000 variables), since some constraints may require extra spins to be added for the constraints to be enforced. The method to approach the constrained problem is to perform the conversion to the unconstrained form, potentially adding a large number of additional spin variables in the process (e.g., starting with 1,000 variables and ending up with 1,000,000 spins after the conversion), using the hybrid optimization algorithm to find a reduced-energy (e.g., the minimum-energy) configuration, and then read out only the spins that correspond to solutions of the original constrained problem, since the constraint-implementing spins may only be needed at the intermediate stage of variationally optimizing the energy.

There exists a correspondence between spin models and neural networks, wherein a single spin represents (or maps to) a single neuron. The methods in this disclosure provide a way to represent, in a quantum computer, classical neural networks that have a number of neurons that is given by an exponential function of the number of qubits used. Hopfield neural networks, given their correspondence with the Ising model, can be realized, allowing the simulation of an associative memory. More broadly, going beyond the Ising model, real-valued neurons in XY spins can be encoded and the methods in this disclosure can be used to read out just a subset of neurons, which can be defined as the output of the neural network. The topology of the neural network is encoded in the Hamiltonian, which can be updated at will since it is stored classically. This allows for training to be performed, where, for example, the J matrix in the XY Hamiltonian can be modified in response to the observed outputs from the network.

FIG. 1 is a flow chart illustrating a method for simulating a classical spin model using a combination of a QPU (quantum processor unit) 201 and a Classical Processor 200. The Classical Processor 200 and the QPU 201 are communicatively coupled together.

A spin model is input 100 to the classical processor. This model is typically specified by a Hamiltonian.

The Classical Processor 200 determines an initial spin-configuration-preparation circuit to be executed on the QPU 201.

The QPU 201 executes 220 the circuit to prepare the spin configuration.

The QPU 201 performs 221 a measurement of a macroscopic property of the spin configuration 221. The choice of macroscopic property is to be determined by the user based on their application. Two examples of macroscopic properties that the user might choose are magnetization and energy.

The QPU 201 sends to the measurement result to the Classical Processor 200. The Classical Processor 200 determines 210 how to update the spin-configuration-preparation circuit based on the measurement result.

The Classical Processor 200 updates 211 the circuit and the updated circuit may again be passed to the QPU 201. This cycle repeats until it stops (e.g., due to a stopping condition being met). The stopping condition may, for example, be that a threshold number of iterations has been performed, or that the record of measurement results satisfies some condition (such as that the macroscopic property has not changed substantially over a certain number of iterations, e.g., it has converged).

The output of the method is a record 101 of the measured macroscopic property for each iteration of the method.

Figure 2:
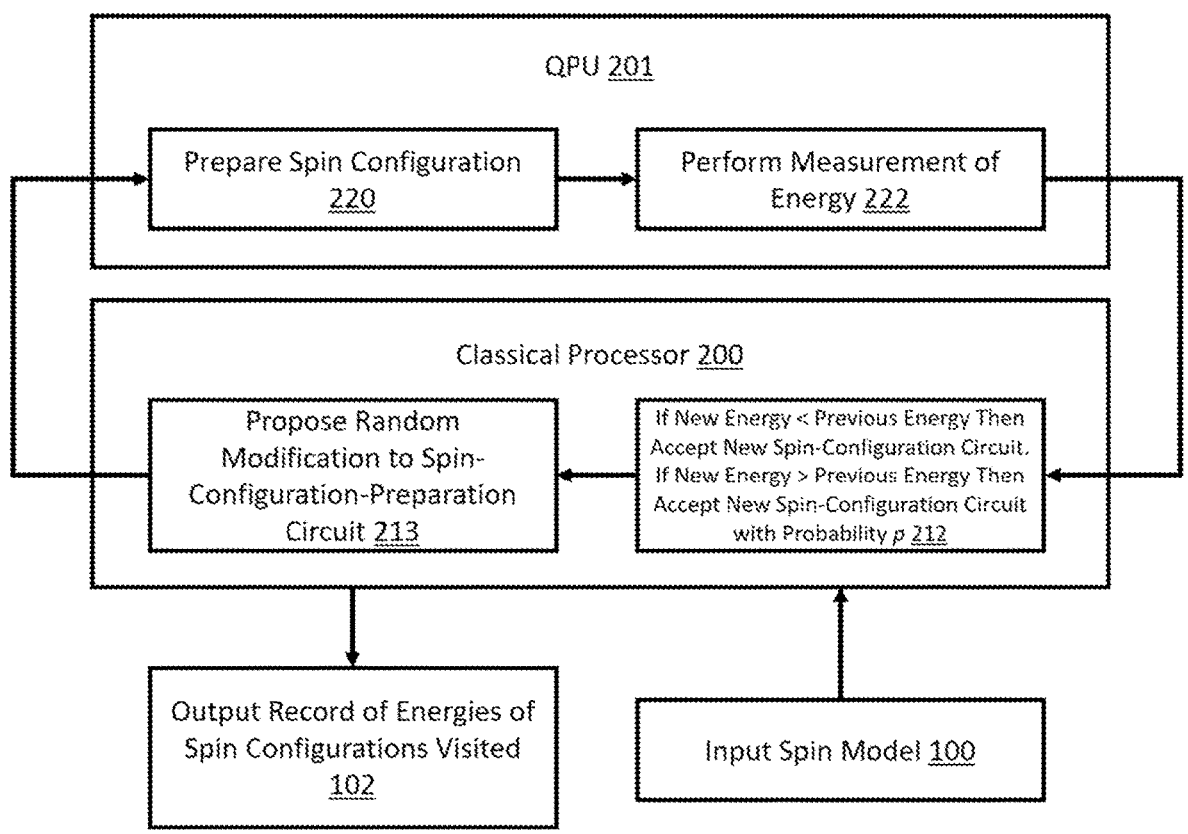
FIG. 2: A flow chart illustrated a method to simulate a classical spin model on a quantum computer using a hybrid method that uses a quantum processor (QPU) 201 and a classical processor 200, according to an embodiment. Compared to FIG. 1, this method is specialized to seek to output energies of the spin model, with the method designed to find energies that may be lower or higher depending on the choice of the acceptance probability p.

FIG. 2 is a flow chart illustrating a method for simulating a classical spin model using a combination of a QPU 201 and a Classical Processor 200. One difference versus the method in FIG. 1 is that the property of the spin configuration being computed by the QPU 201 is the energy, and the Classical Processor 200 makes decisions about updates to the spin-configuration-preparation-circuit in 213 using the process in 212 that considers whether the previous spin-configuration-update had caused the spin-configuration energy to increase or decrease.

A spin model is input 100 to the classical processor. This model is typically be specified by a Hamiltonian.

The Classical Processor 200 determines an initial spin-configuration-preparation circuit to be executed on the QPU 201.

The QPU 201 executes 220 the circuit to prepare the spin configuration.

The QPU 201 performs 222 a measurement of the energy of the spin configuration 222.

The QPU 201 sends to the measurement result to the Classical Processor 200. The Classical Processor 200 determines 212 how to update the spin-configuration-preparation circuit based on the energy. For example, if the new energy is lower than the energy of the previous configuration, then the new spin-configuration-preparation circuit is accepted— meaning that the Classical Processor 200 updates a memory containing the spin-configuration-preparation circuit to store the new circuit. If the new energy is not lower, then the new-spin-configuration-preparation circuit is only accepted with some probability p that is typically be chosen to be <1. This procedure may be analogous to simulated annealing or related Markov Chain Monte Carlo methods used in simulations of spin systems on classical computers, where the choice of probability p can govern the effective temperature that the system is simulated at.

The Classical Processor 200 updates 213 the circuit by proposing a (e.g., random) modification (either to the circuit structure or to one of the parameters of the gates in the circuit) and the updated circuit may again be passed to the QPU 201. This cycle repeats until it stops (e.g., due to a stopping condition being met). The stopping condition may, for example, be that a threshold number of iterations has been performed, or that the record of measured energies satisfies some condition (such as that the energy has not changed substantially over a certain number of iterations, e.g., it has converged).

The output of the method is a record 102 of the energy for each iteration of the method.

Figure 3:
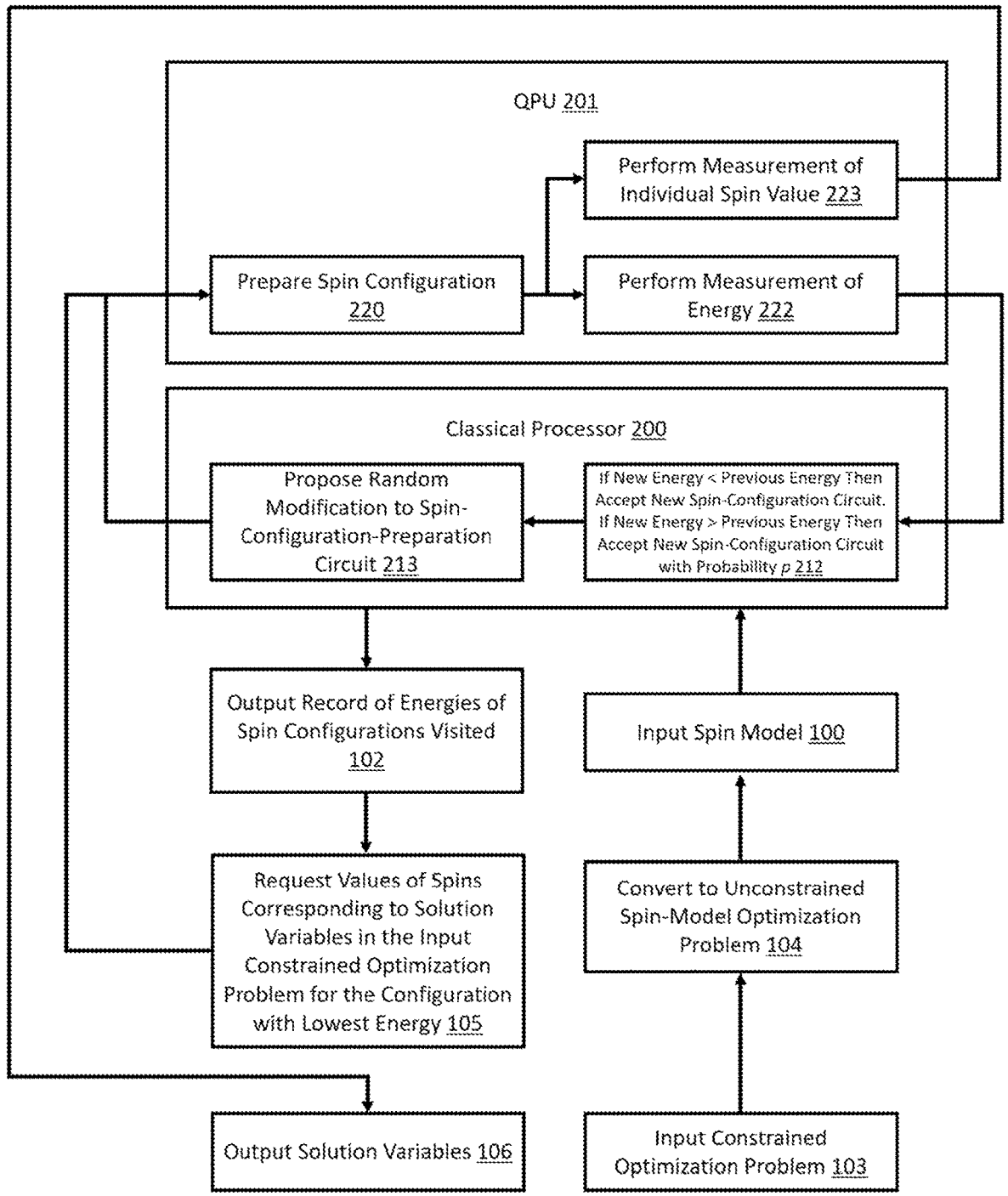
FIG. 3: A flow chart illustrated a method to heuristically find the minimum of an optimization problem with constraints, according to an embodiment. The constrained problem is mapped to a spin model that is unconstrained, and this spin model is optimized in a hybrid method involving both a quantum processor (QPU) 201 and a classical processor 200. Once enough iterations of the optimization have occurred, the quantum processor is used again to reveal the spin values for the lowest-energy configuration. In this example, only the spin values that correspond to solution variables in the original optimization problem are requested.

FIG. 3 is a flow chart illustrating a method for simulating a classical spin model using a combination of a QPU 201 and a Classical Processor 200 for the purpose of finding a low-energy (low-cost) heuristic solution to a constrained combinatorial-optimization problem.

A constrained optimization problem is determined 103.

The constrained problem is converted 104 to a spin model that has no constraints. The resulting spin model may generally have more spins (variables) than the original problem, because standard methods for converting constrained to unconstrained problems tend to introduce auxiliary variables. The spin model is input 100 to the classical processor 200.

The Classical Processor 200 determines initial spin-configuration-preparation circuit to be executed on the QPU 201.

The QPU 201 executes 220 the circuit to prepare the spin configuration.

The QPU 201 performs 220 a measurement of the energy of the spin configuration.

The QPU 201 sends to the measurement result to the Classical Processor 200. The Classical Processor 200 determines 212 how to update the spin-configuration-preparation circuit based on the energy. For example, if the new energy is lower than the energy of the previous configuration, then the new spin-configuration-preparation circuit is accepted— meaning that the Classical Processor 200 updates a memory containing the spin-configuration-preparation circuit to store the new circuit. If the new energy is not lower, then the new-spin-configuration-preparation circuit is only accepted with some probability p that is typically be chosen to be <1. This procedure may be analogous to simulated annealing or related Markov Chain Monte Carlo methods used in simulations of spin systems on classical computers.

The Classical Processor 200 updates 213 the circuit by proposing a (e.g., random) modification (either to the circuit structure or to one of the parameters of the gates in the circuit) and the updated circuit may again be passed to the QPU 201. This cycle repeats until it stops. The stopping condition may, for example, be that a threshold number of iterations has been performed, or that the record of measured energies satisfies some condition (such as that the energy has not changed substantially over a certain number of iterations, e.g., it has converged).

The record 102 of the energy for each iteration of the method may be searched for the iteration that had the lowest energy, and the QPU 201 may perform an additional (e.g., final) task (e.g., in response to a request 105): executing the spin-configuration-preparation for this iteration one more time, but instead of measuring the energy, a measurement of the spins corresponding to the variables in the original constrained problem may be performed 223.

The output 106 of the method is the set of solution variable values for the lowest observed energy configuration.

FIG. 4 is an example spin-configuration-preparation circuit that prepares an Ising-model spin configuration using the sign encoding for spins. This circuit comprises Hadamard gates H followed only by Z and Controlled-Z gates. Any sequence of Z and Controlled-Z gates may produce a state that corresponds to an Ising spin configuration with sign encoding.

Figure 5:
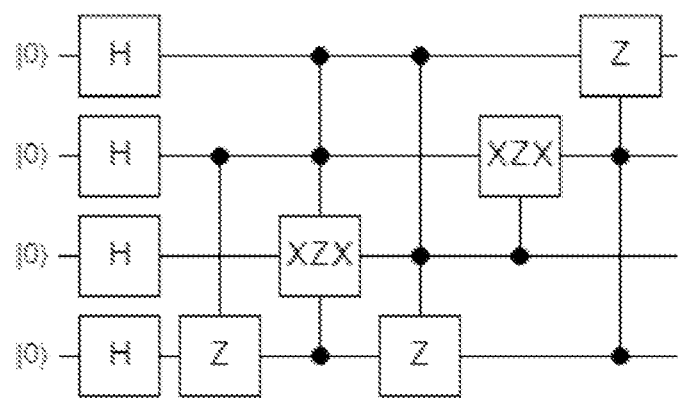
FIG. 5 is another example spin-configuration-preparation circuit that prepares an Ising-model spin configuration using the sign encoding for spins.

FIG. 5 is an example spin-configuration-preparation circuit that prepares an Ising-model spin configuration using the sign encoding for spins. This circuit is more general than the circuit in FIG. 4 since it allows for multiple control qubits on the Controlled gates, and allows the choice of either Z or XZX as the operation to be applied to the target qubit. Circuits like this one, comprising Hadamard gates on all the qubits followed by multi-Controlled-Z or -XZX gates can reach a larger subspace of possible Ising configurations than the circuit class illustrated in FIG. 4.

Some embodiments relate to a method for embedding a spin configuration of a classical spin model with $N:=2^n$ spins in n qubits of a quantum computer. The method comprises representing the spin configuration in a superposition state of n qubits, $$|\psi\rangle = \sum_{i=0}^{2^n-1} \alpha_i |i\rangle,$$

where each amplitude $\alpha_i$ represents the value of a classical spin. Multiple conventions for how to represent classical spin values in these amplitudes are available, and depend on the particular spin model being targeted. A single spin model may comprise multiple types of spins (e.g., Ising spins and XY spins). The method may be performed by a computing system (e.g., including a quantum processor (e.g., QPU 201) and a classical processor (e.g., 200)) that executes instructions stored on a non-transitory computer-readable storage medium.

The spin model may be a Heisenberg model and the encoding of $\alpha_1$ is a combination of phase and magnitude encoding or a combination of real and imaginary encoding. The spin model may represent the Hopfield model and variational optimization results in the generation of an associative memory.

In some embodiments, a classical computer is used to update the variational parameters based on read-out properties of the current spin configuration. The classical computer may use an optimization procedure to modify the variational parameters such that the read-out energy of the spin configuration is reduced (e.g., minimized). The classical computer may use a Markov Chain Monte Carlo (Simulated Annealing) procedure for choosing updated variational parameters. For example, a previous update of the parameters is accepted with probability 1 if the new spin configuration's energy is lower than an artificial temperature T, and the update of parameters is accepted with probability <1 based the difference in energy and the artificial temperature T, if the new spin configuration's energy is higher. A readout circuit may be used to extract thermal properties of the spin model at temperature T.

In some embodiments, a thermofield-double state $$|TFD(\beta)\rangle := \frac{1}{\sqrt{Z}} \sum_n e^{-\beta E_n/2} |n\rangle |n\rangle$$

is variationally created. Readout may be performed to determine thermal properties of a spin model without running a Markov Chain Monte Carlo approach.

An optimization problem with constraints may be converted to an optimization problem with no constraints but more variables (e.g., spins), and the method may be used to solve the larger unconstrained problem. Readout of individual spins may be used to extract the solution of the original problem efficiently by only reading out the spins that correspond to variables in the original (constrained problem). The additional spins that correspond to constraint-enforcers may not be read out.

The spins may be interpreted as neurons to enable the embedding of neural networks with e.g., $N:=2^n$, neurons inn qubits of a quantum computer.

Additional Considerations

A quantum processing device (also referred to as a quantum computer, quantum processor, or quantum processing unit) exploits the laws of quantum mechanics in order to perform computations. Quantum processing devices commonly use so-called qubits, or quantum bits. While a classical bit always has a value of either 0 or 1, a qubit is a quantum mechanical system that can have a value of 0, 1, or a superposition of both values. Example physical implementations of qubits include superconducting qubits, spin qubits, trapped ions, arrays of neutral atoms, and photonic systems (e.g., photons in waveguides). For the purposes of this disclosure, a qubit may be realized by a single physical qubit or as an error-protected logical qubit that itself comprises multiple physical qubits. The disclosure is also not specific to qubits. The disclosure may be generalized to apply to quantum processors whose building blocks are qudits (d-level quantum systems, where d>2) or quantum continuous variables, rather than qubits.

A quantum circuit is an ordered collection of one or more gates. A sub-circuit may refer to a circuit that is a part of a larger circuit. A gate represents a unitary operation performed on one or more qubits. Quantum gates may be described using unitary matrices. The depth of a quantum circuit is the least number of steps needed to execute the circuit on a quantum computer. The depth of a quantum circuit may be smaller than the total number of gates because gates acting on non-overlapping subsets of qubits may be executed in parallel. A layer of a quantum circuit may refer to a step of the circuit, during which multiple gates may be executed in parallel. In some embodiments, a quantum circuit is executed by a quantum computer. In this sense a quantum circuit can be thought of as comprising a set of instructions or operations that a quantum computer should execute. In order to execute a quantum circuit on a quantum computer, a user may inform the quantum computer what circuit is to be executed. A quantum computer may include both a core quantum device and a classical peripheral/control device that is used to orchestrate the control of the quantum device. It is to this classical control device that the description of a quantum circuit may be sent when one seeks to have a quantum computer execute a circuit.

A variational quantum circuit may refer to a parameterized quantum circuit that is executed many times, where each time some of the parameter values may be varied. The parameters of a parameterized quantum circuit may refer to parameters of the gate unitary matrices. For example, a gate that performs a rotation about the y axis may be parameterized by a real number that describes the angle of the rotation. Variational quantum algorithms are a class of hybrid quantum-classical algorithm in which a classical computer is used to choose and vary the parameters of a variational quantum circuit. Typically the classical processor updates the variational parameters based on the outcomes of measurements of previous executions of the parameterized circuit.

The description of a quantum circuit to be executed on one or more quantum computers may be stored in a non-transitory computer-readable storage medium. The term "computer-readable storage medium" should be taken to include a single medium or multiple media (e.g., a centralized or distributed database, or associated caches and servers) able to store instructions. The term "computer-readable medium" shall also be taken to include any medium that is capable of storing instructions for execution by the quantum computer and that cause the quantum computer to perform any one or more of the methodologies disclosed herein. The term "computer-readable medium" includes, but is not limited to, data repositories in the form of solid-state memories, optical media, and magnetic media.

The approaches described above may be amenable to a cloud quantum computing system, where quantum computing is provided as a shared service to separate users. One example is described in patent application Ser. No. 15/446,973, "Quantum Computing as a Service," which is incorporated herein by reference.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Alternative embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. As used herein, 'processor' may refer to one or more processors. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the above description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation, and details of the methods and apparatuses disclosed herein without departing from the spirit and scope of the invention.

What is claimed is:

1. A method comprising:
receiving a classical spin model for I spins defined by a Hamiltonian, the Hamiltonian specifying an energy of a configuration of the I spins; and
determining a quantum circuit that, when executed by a quantum computer, prepares an n-qubit quantum state in the quantum computer, wherein n<I, and the quantum state $|\psi\rangle$ is a superposition representing the configuration of the I spins of the classical spin model, $$|\psi\rangle = \sum_{i=0}^{I-1} \alpha_i |i\rangle,$$

where $|i\rangle$ is a spin index respresenting a single spin i in the configuration of the I spins and $\alpha_i$ is an amplitude that represents a spin value of spin i in the configuration of the I spins.

2. The method of claim 1, wherein the number of spins I is equal to $2^n$.

3. The method of claim 1, wherein $\alpha_i$ is a real number.

4. The method of claim 1, wherein $\alpha_i$ is a complex number.

5. The method of claim 1, wherein $\text{sign}(\alpha_i)$ represents the spin value of spin i.

6. The method of claim 1, wherein a magnitude of $\alpha_i$ represents the spin value of spin i.

7. The method of claim 1, wherein the classical spin model is an Ising model, $\alpha_i$ is a real number, and $\text{sign}(\alpha_i)$ represents the spin value of spin i.

8. The method of claim 1, wherein the classical spin model is an Ising model, $\alpha_i$ is a real number or complex number, and a magnitude of $\alpha_i$ represents the spin value of spin i.

9. The method of claim 1, wherein the classical spin model is an XY model, $\alpha_i$ is a complex number, and angle $(\alpha_i)$ represents the spin value of spin i.

10. The method of claim 1, wherein the classical spin model is an XY model, is a real number or complex number, and a magnitude of $\alpha_i$ represents the spin value of spin i.

11. The method of claim 1, further comprising:
executing the quantum circuit by the quantum computer;
executing a readout quantum circuit by the quantum computer, wherein execution of the readout quantum circuit modifies the quantum state $|\psi\rangle$ to form an output quantum state;
measuring the output quantum state of the quantum computer; and
determining a property of the configuration of the I spins based on the measured output quantum state.

12. The method of claim 11, wherein the property is the spin value of a spin in the configuration of the I spins, a magnetization of the configuration of the I spins, a spin-spin correlation between two spins in the configuration of the I spins, a sum of spin-spin correlations, the energy of the configuration of the I spins, or a spin structure factor of the configuration of the I spins.

13. The method of claim 11, wherein the readout quantum circuit comprises: quantum gates that perform a Hadamard Test with the quantum state, quantum gates that perform a Swap Test with the quantum state, or quantum gates that apply a Quantum Fourier Transform to the quantum state $|\psi\rangle$.

14. The method of claim 1, further comprising:
repeatedly executing the quantum circuit by the quantum computer;
for each execution of the quantum circuit:
selecting a measurement basis from a set of measurement bases; and
measuring the quantum state $|\psi\rangle$ of the quantum computer using the selected measurement basis; and
applying a neural network model to the measurements, wherein the neural network model is trained to determine a property of the configuration of the I spins based on the measurements.

15. The method of claim 1, wherein determining the quantum circuit comprises:
determining quantum gates to be applied to the n qubits of the quantum computer;
determining an arrangement of the quantum gates in the quantum circuit; and
determining one or more gate parameters for one or more of the quantum gates, wherein the one or more quantum gate parameters include at least one of: a single-qubit-rotation-gate angle, a controlled-phase-gate phase, or a generic multi-qubit-gate matrix entry.

16. The method of claim 1, further comprising executing the quantum circuit by the quantum computer, wherein executing the quantum circuit comprises:
initializing each qubit of the n qubits in state 0;
applying a Hadamard gate to each qubit of the n qubits; and
subsequent to applying the Hadamard gate to each qubit, applying a combination of only Z gates and controlled-Z gates to the n qubits.

17. The method of claim 1, further comprising executing the quantum circuit by the quantum computer, wherein executing the quantum circuit comprises:
initializing each qubit of the n qubits in state 0;
applying a Hadamard gate to each qubit of the n qubits; and
subsequent to applying the Hadamard gate to each qubit, applying a combination of only multi-control-qubit Controlled-U gates to the n qubits, wherein U is a Z gate or a group of XZX gates.

18. The method of claim 1, further comprising:
executing the quantum circuit by the quantum computer;
executing a readout quantum circuit by the quantum computer to form an output quantum state;
measuring the output quantum state of the quantum computer;
determining, by a non-quantum computer, a property of the configuration of the I spins based on the measured output quantum state; and
determining, by the non-quantum computer, a second set of quantum circuit parameters based on the property.

19. A non-transitory computer-readable storage medium comprising stored instructions to determine a quantum circuit that, when executed by a quantum computer, prepares an n-qubit quantum state in the quantum computer, the quantum state $|\psi\rangle$ being a superposition representing a configuration of I spins of a classical spin model, $$|\psi\rangle = \sum_{i=0}^{I-1} \alpha_i |i\rangle,$$

where $|i\rangle$ is a spin index respresenting a single spin i in the configuration of the I spins and $\alpha_i$ is an amplitude that represents a spin value of spin i in the configuration of the I spins, wherein n<I.

20. A quantum circuit that, when executed by a quantum computer, prepares an n-qubit quantum state in the quantum computer, the quantum state $|\psi\rangle$ being a superposition representing a configuration of I spins of a classical spin model, $$, |\psi\rangle = \sum_{i=0}^{I-1} \alpha_i |i\rangle,$$

where $|i\rangle$ is a spin index representing a single spin i in the configuration of the I spins and $\alpha_i$ is an amplitude that represents a spin value of spin i in the configuration of the I spins, wherein n<I.

* * * * *